United States Patent
Stevens et al.

(10) Patent No.: US 11,356,925 B1
(45) Date of Patent: Jun. 7, 2022

(54) SYSTEMS AND METHODS OF MOBILE AD HOC NETWORK IP ROAMING

(71) Applicant: Rockwell Collins, Inc., Cedar Rapids, IA (US)

(72) Inventors: James A. Stevens, Cedar Rapids, IA (US); Jeffrey D. Bouis, Cedar Rapids, IA (US); Naveen Rajanikantha, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 224 days.

(21) Appl. No.: 16/721,763

(22) Filed: Dec. 19, 2019

Related U.S. Application Data (60) Provisional application No. 62/782,329, filed on Dec. 19, 2018.

(51) Int. Cl.
| | |
|---|---|
| *H04W 40/24* | (2009.01) |
| *H04W 92/06* | (2009.01) |
| *H04W 80/02* | (2009.01) |
| *H04B 1/00* | (2006.01) |
| *H04W 84/18* | (2009.01) |

(52) U.S. Cl.
CPC ........ *H04W 40/248* (2013.01); *H04B 1/0003* (2013.01); *H04W 80/02* (2013.01); *H04W 92/06* (2013.01); *H04W 84/18* (2013.01)

(58) Field of Classification Search
CPC ... H04W 40/248; H04W 92/06; H04W 80/02; H04W 84/18; H04B 1/0003
See application file for complete search history.

(56) References Cited

U.S. PATENT DOCUMENTS

| | | | |
|---|---|---|---|
| 8,391,208 B1 * | 3/2013 | Breau | H04W 60/00 370/328 |
| 2008/0250484 A1 * | 10/2008 | Chong | H04L 63/0245 726/7 |
| 2018/0175951 A1 * | 6/2018 | Ranganathan | H04L 43/14 |
| 2020/0145829 A1 * | 5/2020 | Rule | H04L 63/10 |

* cited by examiner

*Primary Examiner* — Brenda H Pham
(74) *Attorney, Agent, or Firm* — Suiter Swantz pc llo (57) ABSTRACT

A network device includes at least one of a baseband interface or a loopback interface, a wireless radio frequency (RF) interface, and a processing circuit. The baseband interface is coupled to a first node. The wireless RF interface is coupled to a second node. The processing circuit assigns a routable address to the at least one of the baseband interface or the loopback interface, assigns a non-routable address to the first node based on the first node being a gateway interface, assigns a routable address to the first node based on the first node not being a gateway interface, and assigns a non-routable address to the second node based on the second node being coupled to the wireless RF interface.

16 Claims, 6 Drawing Sheets

SYSTEMS AND METHODS OF MOBILE AD HOC NETWORK IP ROAMING

CROSS-REFERENCE TO RELATED APPLICATIONS

The present disclosure claims the benefit of and priority to U.S. Provisional Application No. 62/782,329, title "SYSTEMS AND METHODS OF MOBILE AD HOC NETWORK IP ROAMING," filed Dec. 19, 2018, the disclosure of which is incorporated herein by reference in its entirety.

STATEMENT OF GOVERNMENTAL INTEREST

The present disclosure was made with U.S. Government support under Agreement No. W15QKN-15-9-1004 awarded by the ACC-NJ to the National Spectrum Consortium (NSC) subcontract S161001 for the Soldier Radio Network Narrowband (SRW-NB) program under the NSC. The government has certain rights in the present disclosure.

BACKGROUND

The present disclosure relates generally to the field of mobile ad hoc networks (MANETs). More particularly, embodiments of the inventive concepts disclosed herein relate to systems and methods of MANET Internet Protocol (IP) roaming.

MANETs can be used to enable wireless communication between several devices. The devices may move in physical space as well as change frequencies of operation. The MANET may include gateways to connect to the Internet.

SUMMARY

In one aspect, the inventive concepts disclosed herein are directed to a network device. The network device includes at least one of a baseband interface or a loopback interface, a wireless radio frequency (RF) interface, and computer-readable instructions. The baseband interface is coupled to a first node. The wireless RF interface is coupled to a second node. The computer-readable instructions cause the one or more processors to assign a routable address to the at least one of the baseband interface or the loopback interface, assign a non-routable address to the first node based on the first node being a gateway interface, assign a routable address to the first node based on the first node not being a gateway interface, and assign a non-routable address to the second node based on the second node being coupled to the wireless RF interface.

In a further aspect, the inventive concepts disclosed herein are directed to a method of operating a wireless ad hoc network. The method includes assigning a routable address to at least one of a baseband interface or a loopback interface, the baseband interface coupled to a first node, assigning a non-routable address to the first node based on the first node being a gateway interface, assigning a routable address to the first node based on the first node not being a gateway interface, and assigning a non-routable address to a second node coupled to a wireless radio frequency (RF) interface.

In a further aspect, the inventive concepts disclosed herein are directed to a non-transitory computer-readable medium storing computer-readable instructions that when executed by one or more processors, cause the one or more processors to assign a routable address to at least one of a baseband interface or a loopback interface of a network device, assign a non-routable address to a first node coupled to the baseband interface based on the first node being a gateway interface, assign a routable address to the first node based on the first node not being a gateway interface, and assign a non-routable address to a second node coupled to a wireless radio frequency (RF) interface of the network device based on the second node being coupled to the wireless RF interface.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods of mobile ad hoc network (MANET) Internet Protocol (IP) roaming. In some embodiments, a network device includes at least one of a baseband interface or a loopback interface, a wireless radio frequency (RF) interface, and one or more processors. The baseband interface can be coupled to a first node. The wireless RF interface can be coupled to a second node. The one or more processors can assign a routable address to the at least one of the baseband interface or the loopback interface, assign a non-routable address to the first node based on the first node being a gateway interface, and assign a routable address to the first node based on the first node not being a gateway interface. Systems and methods in accordance with the inventive concepts disclosed herein can improve MANET by enabling MANET node roaming and reducing network overhead associated with MANET operations. Systems and methods in accordance with the inventive concepts disclosed herein can provide session continuity and IP address reachability (e.g., as set forth in RFC 8653) with reduced overhead.

The inventive concepts disclosed herein can be utilized in a number of communication systems, including routers, network switches, handheld radios, backpack radios, software defined radios (SDRs), end user devices, and gateways. The inventive concepts disclosed herein can be used for various types of electronic avionics applications for ground-based platforms and airborne platforms (e.g., aircraft), including but not limited to flight control and autopilot systems, navigation systems, flight display systems, communications systems, radar systems, electric power systems, engine control systems, and monitor warning systems.

Figure 1:
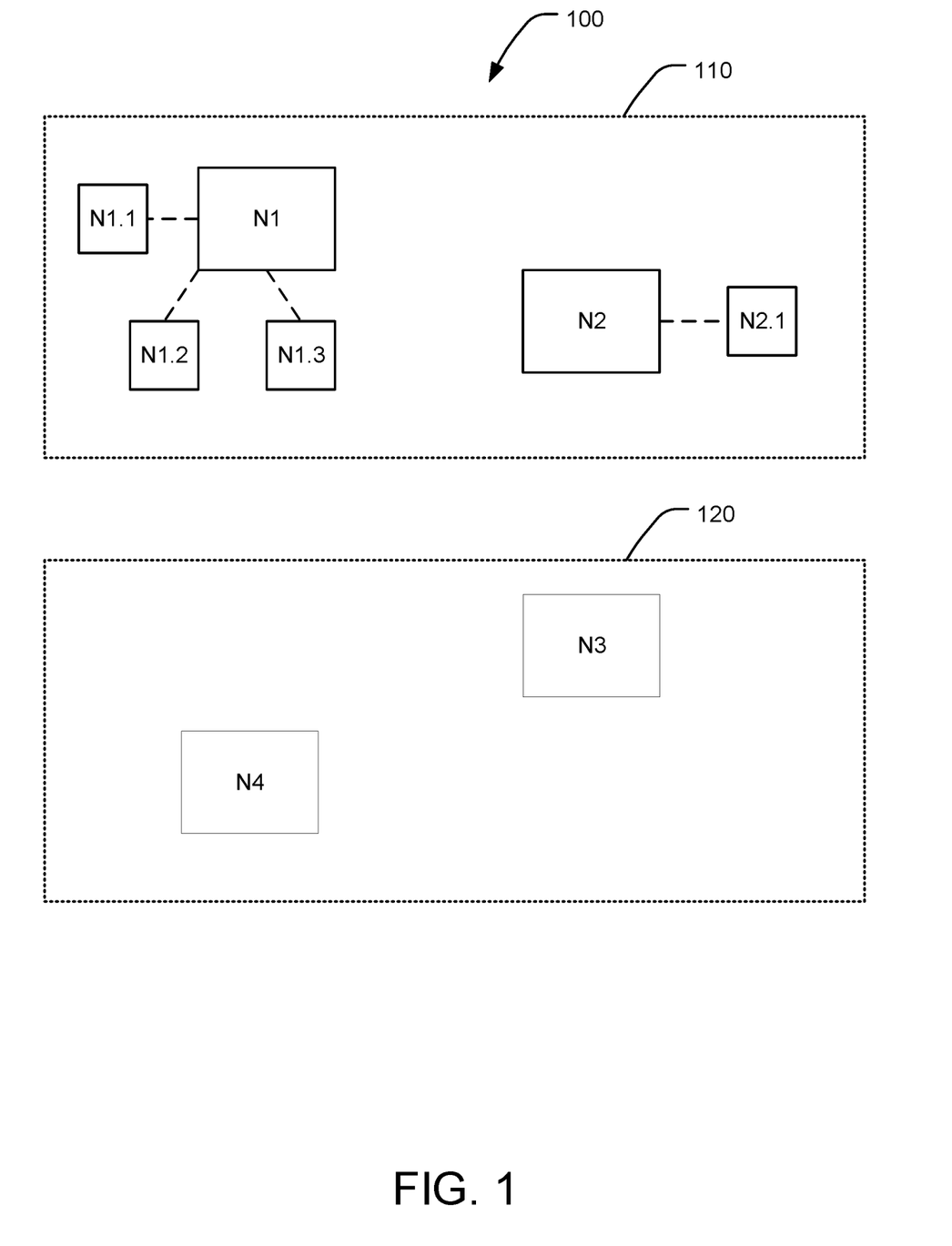
FIG. 1 is a schematic diagram of an exemplary embodiment of a MANET according to the inventive concepts disclosed herein.

Referring now to FIG. 1, an embodiment of a network 100 according to the inventive concepts disclosed herein includes a plurality of nodes N1, N2, N3, and N4. The network 100 can be a MANET. The nodes N1, N2, N3, and N4 can be used for MANET communications, such as by including interfaces that can perform direct and indirect peer-to-peer communications, including wireless communications, such as wireless radio frequency (RF) communications. The nodes N1, N2, N3, and N4 can be sources and sinks of traffic, such as text or other data. The nodes N1, N2, N3, and N4 can be wireless routers for end user devices attached to the nodes N1, N2, N3, and N4 (e.g., as described below, nodes N1.1, N1.2, N1.3, and/or N2.1 can be end user devices communicatively coupled to respective nodes N1, N2). The nodes N1, N2, N3, N4 can include a wireless interface and a baseband interface. The nodes N1, N2, N3, N4 can include SDR links to enable the use of multiple RF channel SDRs.

The node N1 is coupled to nodes N1.1, N1.2, and N1.3, and the node N2 is coupled to a node N2.1. For example, nodes N1.1-N1.3 and N2.1 can be communicatively coupled to respective nodes N1, N2 using a baseband link of the nodes N1, N2, or a wireless link of the nodes N1, N2. As an example, the node N1 can be a router of an airborne platform, and the nodes N1.1, N1.2, and N1.3 can be electronic devices of the airborne platform that communicate with other nodes of the network 100 via the node N1; the node N2 can be a portable router and the node N2.1 can be a handheld radio that communicates with other nodes of the network 100 via the node N2. At least one of the nodes N1.1, N1.2, N1.3, or N2.1 can be a gateway, such as an internet protocol (IP) gateway that enables the nodes connected to the gateway to communicate using IP communications. As such, nodes of the network 100 connected to gateway nodes may access other parts of the internet via the gateway nodes.

The nodes N1 and N2 (and their respective coupled nodes N1.1, N1.2, N1.3, and N2.1) can communicate in a network 110, such as a wireless network. The nodes N3 and N4 can communicate in a network 120, which can also be a wireless network. The networks 110, 120 may be separated; for example, each of the nodes of the network 110 may be out of a wireless transmission range from each of the nodes of the network 120. The networks 110, 120 may operate on different frequencies.

Figure 2:
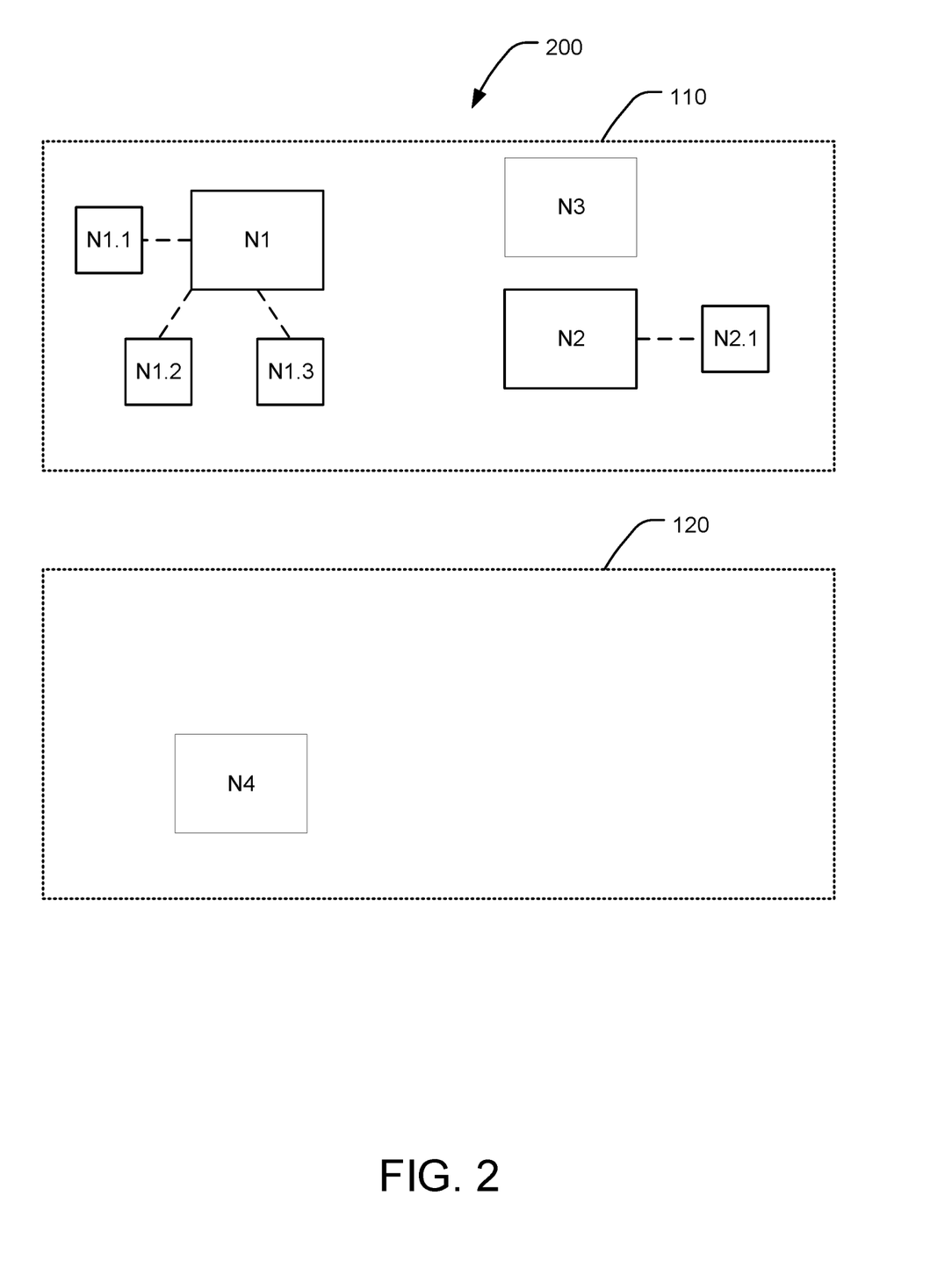
FIG. 2 is a schematic diagram of an exemplary embodiment of the MANET of FIG. 1 in which a node has moved according to the inventive concepts disclosed herein.

Referring now to FIG. 2, an embodiment of a network 200 according to the inventive concepts disclosed herein illustrates the node N3 having roamed (e.g., moved) from the network 120 to the network 110. The roaming of the node N3 from the network 120 to the network 110 may correspond to the node N3 moving in physical space such that the node N3 is in a wireless transmission range of at least one node of the network 110 and not in wireless transmission range of at least one node of the network 120. The roaming of the node N3 may correspond to the node N3 changing its point of attachment to an external network.

However, it can be expensive in network management complexity, time to coordinate, and/or network traffic overhead for the node N3 to roam from the network 120 to the network 110. For example, when unit task reorganization (UTR) is performed, such as by military nodes, these issues can be a significant contributor to the time required for nodes to switch between networks. Organizations often have hundreds to thousands of mobile nodes to be deployed within an area. The mobile nodes may be organized into communities of interest (COIs) with significant communications between the nodes of the COI as well as communications with nodes outside of the COI. For example, COIs may correspond to armies deployed by echelon, such as platoon, company, or battalion, as well as by mission, such as call for fires, engineering, or medical. The networks 110, 120 may each represent a respective COI.

The COIs can be deployed as MANETs, such as with each COI being in a separate IP network and also in a separate wireless network. The separate IP networks can be IP subnets having different prefixes (and corresponding different IP address spaces). For example, the network 110 can be a first IP subnet, of a first COI, having a first prefix, and the network 120 can be a second IP subnet, of a second COI, having a second prefix. The separate wireless networks can be on different frequencies such that the nodes of a first COI (e.g., of network 110) do not communicate with nodes in other COIs (e.g., network 120) directly through a wireless network. COI MANETs can partition as nodes get too far apart (e.g., certain nodes of the COI are no longer in transmission range of other nodes of the COI) or change frequencies, and nodes can roam between COIs as needed to perform their mission. When nodes partition, the nodes may need to use IP communications, as wireless communications may not be available due to distance between nodes and/or nodes operating on different frequencies. When nodes partition, they may have different points of attachment to the internet.

Typical approaches to enable nodes to continue to communicate when roaming, partition, and or attachment point changes occur can result in reduced functionality, increased overhead, and/or increased latency. For example, the node changing its IP address whenever it changes its point of attachment (such as via dynamic host configuration protocol (DHCP), or advertising a different IP address whenever it changes its point of attachment (such as via network address translator (NAT), may make it impossible for a node to maintain transport and higher-layer connections). Using mobile IP (e.g., Mobile IP per RFC 5944), a home IP address, a foreign IP address, and a tunnel between the home network and foreign network, such as is performed with Wi-Fi and cellular connections, can result in extra overhead, coordination of home and foreign agents, extra overhead from the tunneling per packet and overhead and latency of routing traffic from the source network, to the home network, to then be tunneled to the foreign network; if the source network is the foreign network, then the traffic may have to be routed out of the source network and then relayed back in. If the node is part of an entire network that moves using network mobility (e.g., Network Mobility per RFC 3963) with home and foreign agents to tunnel to the new network location, similar issues may result as with mobile IP; additionally, the entire network roams rather than individual nodes. Organizing the network into a large flat network and then using routing protocols to route between nodes, such as by organizing into an inter-domain routing using the IP protocol and an inner-domain protocol using flat network routing, may be problematic due to IP requirements that nodes can only transmit or receive onto links that are in the same IP address subnet—this may result in an enormous flat network (e.g., hundreds or thousands of nodes) with scalability issues due to the inability to efficiently perform classless inter-domain routing (CIDR) address summation, or requiring a mix of standard IP routing with tunneling between the flat routing.

The present solution can enable MANET nodes to communicate if they partition and/or roam from MANETs of different frequencies, without resulting in the loss of functionality or increased overhead/latency issues of typical approaches. For example, the present solution can enable MANET nodes to selectively assign routable or non-routable addresses to connected interfaces and devices based on whether those connected interfaces and devices may be expected to operate as end user devices or infrastructure devices, enabling more efficient routing and reducing the need to re-assign addresses when MANET nodes roam. The present solution can enable MANET nodes to perform unit task reorganization to move from one network to another, to switch networks for faster service, or to move to different areas (such as when airborne nodes move across a region, such as a theater) without having to change IP addresses.

Figure 3:
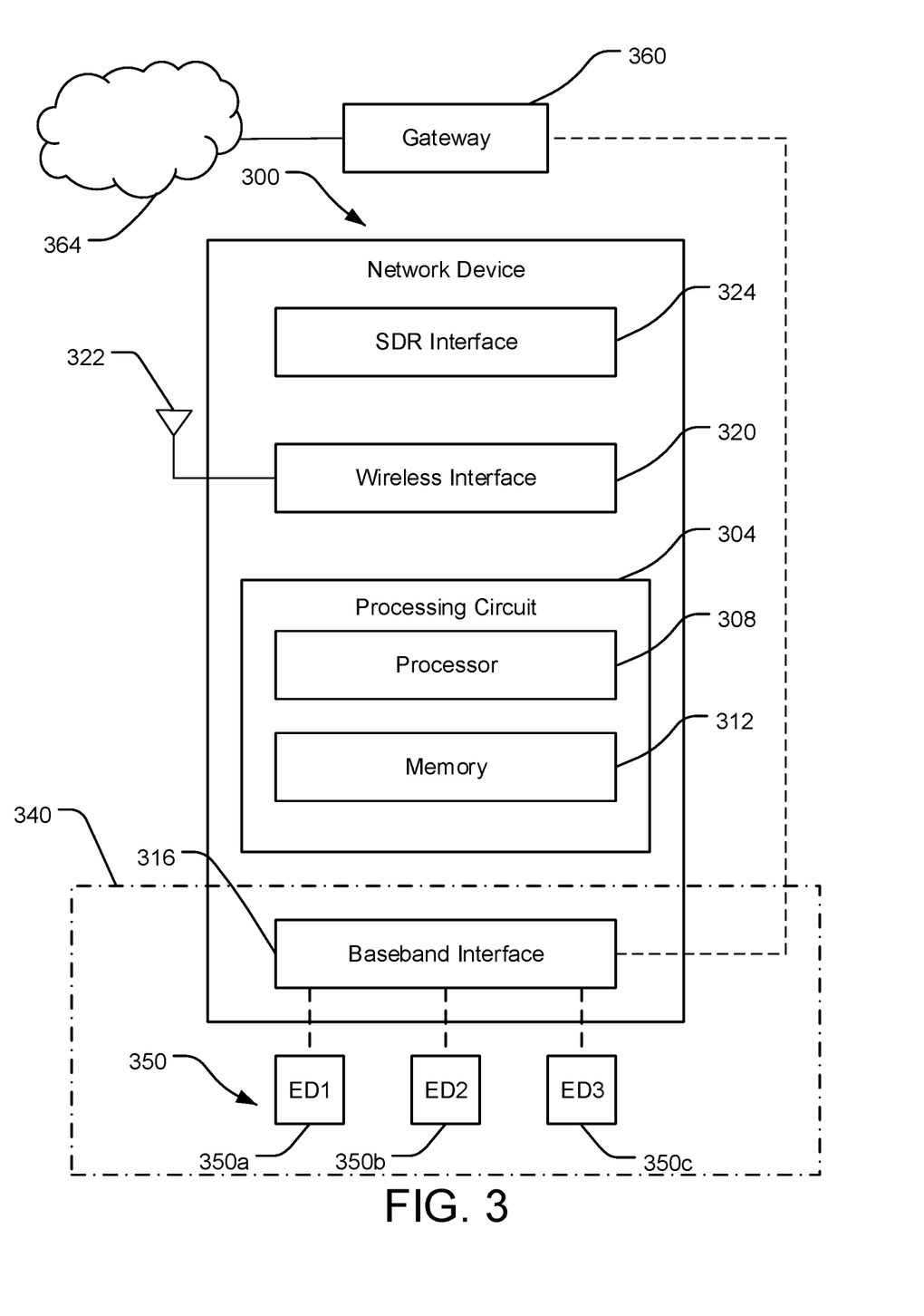
FIG. 3 is a block diagram of an exemplary embodiment of a network device that can be used to implement a MANET according to the inventive concepts disclosed herein.

Referring now to FIG. 3, an embodiment of a network device 300 according to the inventive concepts disclosed herein can be used as a node of MANET, such as to implement the nodes N1, N2, N3, and/or N4 described with reference to the network 100 of FIGS. 1 and 2. A plurality of network devices 300 can be used in the network 100.

The network device 300 includes a processing circuit 304 and a baseband interface 316 coupled to a plurality of end user devices 350. The processing circuit 304 includes a processor 308 and memory 312. The processor 308 may be implemented as a specific purpose processor, an application specific integrated circuit (ASIC), one or more field programmable gate arrays (FPGAs), a group of processing components, or other suitable electronic processing components. The memory 312 is one or more devices (e.g., RAM, ROM, flash memory, hard disk storage) for storing data and computer code for completing and facilitating the various user or client processes, layers, and modules described in the present disclosure. The memory 312 may be or include volatile memory or non-volatile memory and may include database components, object code components, script components, or any other type of information structure for supporting the various activities and information structures of the inventive concepts disclosed herein. The memory 312 is communicably connected to the processor 308 and includes computer code or instruction modules for executing one or more processes described herein. The memory 312 includes various circuits, software engines, and/or modules that cause the processor 308 to execute the systems and methods described herein.

The baseband interface 316 can be a radio network management interface. The baseband interface 316 can include a baseband processor, and can operate using a real-time operating system (RTOS). The baseband interface 316 can include wired ports for connecting to remote devices, such as end user devices 350. The baseband interface 316 can include an Ethernet interface. The baseband interface 316 can include an antenna (not shown) for wirelessly connecting to remote devices, such as end user devices 350. The baseband interface 316 can be a loopback interface, such as a virtual loopback baseband interface.

The end user devices 350, shown to include a first end user device 350*a*, a second end user device 350*b*, and a third end user device 350*c*, can be nodes communicatively coupled to the network device 300 via the baseband interface 316, similar to the nodes N1.1, N1.2, N1.3, and N2.1 described with reference to FIGS. 1 and 2. The end user devices 350 can be various devices that generate and receive data via the network device 300, including IP traffic.

In some embodiments, the network device 300, which itself can be a MANET node, and the end user devices 350 stay together as the network device 300 moves, and can originate and terminate IP traffic, such as IP traffic generated by and/or transmitted to applications executing on the processing circuit 304 or the end user devices 350. For example, the network device 300 and end user devices 3560 can be on a mobile platform, such as an aircraft.

The network device 300 include a wireless interface 320. The wireless interface 320 can be a wireless RF interface, enabling the network device 300 to communicate with other nodes within a wireless transmission range of the wireless interface 320 using RF signals. The wireless interface 320 can include transmit and receive electronics used to communicate via one or more antennas 322. The wireless interface 320 can include at least one of a Wi-Fi radio or a Bluetooth radio.

In some embodiments, the network device 300 includes a software defined radio (SDR) interface 324. The SDR interface 324 can include an intra-channel SDR interface to enable the network device 300 to communicate between SDR hardware channels.

In some embodiments, the network device 300 is coupled to a gateway 360. The gateway 360 can be an Internet gateway, such that the network device 300 can communicate with other devices connected to the Internet via the gateway 360. The gateway 360 can be an external router. As shown in FIG. 3, the network device 300 is coupled to the gateway 360 via the baseband interface 316. For example, the baseband interface 316 can be coupled to the gateway 360 using a wired connection. The network device 300 can be coupled to a plurality of gateways 360. The network device 300 can use an interface separate from the baseband interface 316 to couple to the gateway 360, such as the wireless interface 320.

The processing circuit 304 assigns routable and non-routable addresses (e.g., IP addresses) to the network device 300, including to interfaces of the network device 300, and to nodes such as devices and/or interfaces that the network device 300 is coupled to. The processing circuit 304 can selectively assign routable and non-routable addresses based on whether nodes coupled to the corresponding interfaces may change dynamically. By assigning routable and non-routable addresses, the processing circuit 304 can enable the network device 300 and end user devices 350 coupled to the network device 300 to roam between networks without significant overhead or loss of functionality.

The processing circuit 304 can define an address to be routable or non-routable based on a predetermined address definition. For example, the predetermined address definition can indicate a first portion (e.g., subnet) of an address space to have routable addresses, and a second portion (e.g., subnet) of the address space different than the first portion to have non-routable addresses. The address space can be of the Internet Protocol version 4 (IPv4) or the Internet Protocol version 6 (IPv6). For example, the processing circuit 304 can determine a first subnet of the IPv4 address space to have routable addresses, and a second subnet of the IPv4 address space to have non-routable addresses. Routable addresses can be those which are used to originate and terminate IP traffic throughout a network that the network device 300 is part of (e.g., throughout network 100 described with reference to FIG. 1).

The processing circuit 304 can maintain the predetermined address definition in memory 312, and can update the predetermined address definition responsive to receiving definition updates from remote devices (e.g., other nodes in a network). The predetermined address definition can be shared amongst a plurality of devices, such as the nodes described with reference to FIGS. 1-2, so that each node follows consistent procedures when assigning routable addresses and non-routable addresses. In some embodiments, the predetermined address definition defines non-routable addresses based on IPv4 private address ranges; for example, the predetermined address definition can define non-routable addresses as those in the 10.0.0.0-10.255.255.255 range (e.g., subnet mask 255.0.0.0), 172.16.0.0-172.31.255.255 (e.g., subnet mask 255.240.0.0), and/or 192.168.0.0-192.168.255.255 (e.g., subnet mask 255.255.0.0). The predetermined address definition can define non-routable addresses to include IPv6 link-local addresses.

In some embodiments, the processing circuit 304 assigns a routable address to the network device 300. For example, the processing circuit 304 can assign a routable address to the baseband interface 316. By assigning a routable address to the baseband interface 316, the network device 300 can receive and transmit IP traffic (e.g., IP datagrams) (e.g., using Simple Network Management Protocol (SNMP)).

The processing circuit 304 can assign a non-routable address to the wireless interface 320, the SDR interface 324 (e.g., to intra-channel links of the SDR interface 324), and/or the gateway 360. By assigning non-routable addresses to the wireless interface 320, the SDR interface 324, and/or the gateway 360, the processing circuit 304 can enable the network device 300 to roam between various networks that it is attached to via the wireless interface 320, the SDR interface 324, and/or the gateway 360. The processing circuit 304 can define an IP network of the wireless interface 320 and the nodes connected to the wireless interface 320 to be an IP RF network of the network device 300. When operating using IPv6, the processing circuit 304 can use IPv6 link-local addresses to generate the non-routable addresses.

The processing circuit 304 can assign routable address to each of the end user devices 350 that are not gateway 360 devices. As such, the processing circuit 304 can enable the end user devices 350 to originate and terminate IP traffic. As shown in FIG. 3, the processing circuit 304 can define an IP network of the baseband interface 316 and the end user devices 350 to be an IP local network 340 of the network device 300.

The processing circuit 304 can assign routable or non-routable addresses to a node based a type identifier of the node, such as an interface type identifier. This can enable the processing circuit 304 to consistently assign routable or non-routable addresses together with other network devices 300 in the network, while facilitating reduced overhead.

The processing circuit 304 can identify IP subnets corresponding to the network device 300 and nodes to which the network device 300 is coupled, and assign the respective routable addresses or non-routable addresses from the corresponding IP subnets. For example, the processing circuit 304 can identify a local IP subnet of the baseband interface 316 and/or the end user devices 350, and assign routable addresses to the baseband interface and/or the end user devices 350 from the local IP subnet. In some embodiments, the processing circuit 304 identifies the local IP subnet of the end user devices 350 by requesting the end user devices 350 to communicate the local IP subnet to the processing circuit 304. In some embodiments, the processing circuit 304 identifies the local IP subnet of the baseband interface 316 and/or the end user devices 350 based on information maintained in memory 312.

As discussed above, nodes, such as the network device 300, can be organized into COIs. In some embodiments, the processing circuit 304 maintains in memory 312 an indication of a COI to which the baseband interface 316 and/or the end user devices 350 are assigned (the indication may be received from the end user devices 350 or other nodes of the COI). The indication may indicate a local IP subnet of the COI. The processing circuit 304 can identify the local IP subnet of the COI, and assign the routable addresses to the baseband interface 316 and/or the end user devices 350 from the local IP subnet of the COI.

The processing circuit 304 can use IP subnets to assign non-routable addresses. For example, the processing circuit 304 can identify a gateway IP subnet of the gateway 360, and assign the non-routable address to the gateway 360 from the gateway IP subnet. Where the processing circuit 304 may couple to more than one gateway 360 (including coupling to multiple gateways 360 via the baseband interface 316), the processing circuit 304 assign non-routable addresses to each of the gateways 360 from the gateway IP subnet. The processing circuit 304 can identify an intra-channel IP subnet of the SDR interface 324, and assign the non-routable address to the SDR interface 324 from the intra-channel IP subnet.

By assigning the routable addresses from local IP subnets, such as local IP subnets of COIs, the processing circuit 304 can aggregate the subnets into a hierarchical IP addressing structure. For example, the IP address space can be subdivided into (hierarchical) subnets of COIs and local IP subnets, such as COIs corresponding to mission and/or unit. The local IP subnet can correspond to the network device 300 and the end user devices 350. The COI net can thus operate as a classless inter-domain routing (CIDR) aggregation of multiple local IP subnets, such that the COI net has an IP address prefix length of P, and the local IP subnet has an IP address prefix length of L, where L is greater than P and the local IP subnet is within the COI CIDR aggregation. As such, the processing circuit 304 can reduce routing overhead by reducing the amount of routing path information needed to be communicated between network devices 300 to ensure appropriate data routing. The processing circuit 304 can use route tags (e.g., with Routing Information Protocol (RIP)) to determine whether routing is internal to or external to a particular network (e.g., internal to the network 100 or external to the network 100; internal to the network 340 or external to the network 340). As such, the processing circuit 304 can simplify internal routing and avoid route loops, while also allowing nodes to roam outside of the particular network.

In some embodiments, the processing circuit 304 aggregates the hierarchical IP addresses into primary and secondary networks (e.g., a primary partition, network, and/or subnet, and one or more secondary partitions, networks, and/or subnets). The processing circuit 304 can advertise the primary network as a single COI IP subnet, while advertising the secondary wireless networks(s) for individual wireless node and attached end user device 350 subnets using IP aggregation. The primary network can be a largest network of the network in which the network device 300 is operating, such as a network having a greatest value of a size parameter, the size parameter including at least one of a count of nodes, a greatest count of local IP subnets, or a value of a signaling parameter indicative of the size of the primary network. As such, the processing circuit 304 can enable a non-standard IP address aggregation of the primary network to be advertised as a single subnet—even if there are gaps in the subnet aggregation for that subnet (because, for example, some nodes are not operational or some nodes are in different wireless networks).

In some embodiments, the processing circuit 304 identifies a plurality of wireless networks of the COI subnet of which the network device 300 is a member, counts a number of local IP subnets corresponding to each respective wireless network of the plurality of wireless networks, and determines at least one first wireless network of the plurality of wireless networks to be the primary wireless network based on a size parameter of the at least one first wireless network. For example, the processing circuit 304 can identify the at least one first wireless network that is a candidate primary wireless network by counting a number of nodes of each of the plurality of wireless networks, or by counting a number of local IP subnets of each of the plurality of wireless networks. The processing circuit 304 can determine each wireless network having the greatest count of nodes and/or subnets to be a candidate primary wireless network, and determine the remaining wireless networks to be secondary wireless networks.

In some examples, the processing circuit 304 may determine that a single wireless network is a candidate primary wireless network, and thus unambiguously determine the single wireless network to be the primary wireless network. In some examples, the processing circuit 304 may determine that more than one wireless network is a candidate primary wireless network; for example, if the greatest count of local IP subnets of any of the wireless networks is ten, and three wireless networks have ten local IP subnets, the processing circuit 304 can determine those three wireless networks to be candidate primary wireless networks. In such cases in which the primary wireless network may be ambiguous, the processing circuit 304 may need to further evaluate properties of the candidate primary wireless networks to select one of the candidate primary wireless networks as the primary wireless network. For example, the processing circuit 304 can execute a decision tree using at least one of the count of nodes, the count of local IP subnets, or the signaling parameter to select the primary wireless network (in addition to using the size parameter that was used to identify the candidate primary wireless networks). In some embodiments, the signaling parameter includes a count of IP subnets in the wireless network. In some embodiments, the signaling parameter is based on a thrashing parameter.

Having identified the primary wireless network and the remaining, secondary wireless networks, the processing circuit 304 can apply differing route advertisement strategies to the primary wireless network as compared to the secondary wireless networks, which can reduce overhead by requiring less routing information to be provided in order to enable routing amongst the largest, primary wireless network. For example, as noted above, the processing circuit 304 can advertise (e.g., indicating routing path information regarding) the primary wireless network as a single IP subnet, while advertising individual node/end user device 350 IP subnets for the secondary networks. In some embodiments, the processing circuit 304 provides, to at least one remote node, a single first routing path for routing to the local IP subnets of the primary wireless network, the single first routing path corresponding to the COI subnet. The processing circuit 304 can then provide, to the at least one remote node, a plurality of second routing paths separately corresponding to each respective local IP subnet of each secondary wireless network for routing to each local IP subnet of each secondary wireless network. The processing circuit 304 can advertise the primary network by providing a summarized subnet address for the primary network, and advertise the secondary networks by providing individual node address information using CIDR summarization. Since CIDR forward routes the longest prefix, this ensures that packets are routed to the appropriate network (e.g., appropriate subnet/partition); for example, nodes in the primary network are advertised by the summarized route, and nodes in secondary networks are advertised by a variable length subnet mask (VLSM) that can be formed by CIDR summarization. This can enable COI nets to be spread across multiple networks while avoiding problems associated with multi-link subnets (e.g., as described in RFC 4903; the COI net spreading may result from different local subnets roaming from one network to another).

In some embodiments, the processing circuit 304 uses a mapping from a radio address of the node to which the address is to be assigned to the address. For example, the processing circuit 304 can use a mapping that maps a media access control (MAC) address of the node to the routable or non-routable address that is assigned to the node. The processing circuit 304 can use a deterministic mapping, such as a function that generates a unique output value for any input in a domain of the function; in this case, the domain being the MAC address space. The processing circuit 304 can use the mapping to discover nodes and LocalNets in the network based on receiving MAC level beacons and mapping the IP addresses from the MAC address to the IP address. By mapping the MAC address to the IP address, the processing circuit 304 can reduce network management burden and a total number of address to plan and configure, while enabling automatic address generation and assignment. In addition, the processing circuit 304 can reduce over-the-air traffic needed for network control, because the mapping maps shorter addresses (e.g., addresses having fewer bits, such as radio MAC addresses) to the longer IP addresses, enabling the shorter addresses to be transmitted over-the-air, rather than the longer addresses. As such, the processing circuit 304 can minimize preconfiguration and compress the IP routing overhead, and can provide stateless IP/UDP/TCP header compression.

In some embodiments, the processing circuit 304 assigns external routers, such as a plurality of gateways 360, with a single, non-routable address. This can allow the network device 300 to dynamically switch its point of attachment to the network 364 from a first gateway 360 to a second gateway 360, without having to change the IP address when switching the point of attachment. For example, the processing circuit 304 can assign the same non-routable address to each gateway 360, which may be selected from a gateway IP subnet. The network device 300 may thus switch the gateway 360 to which it is connected without having to preplan the inter-gateway IP link address, allowing MANET networks to dynamically be multi-homed and switch what nodes are connected to external networks without having to dynamically change the IP addresses.

Figure 4:
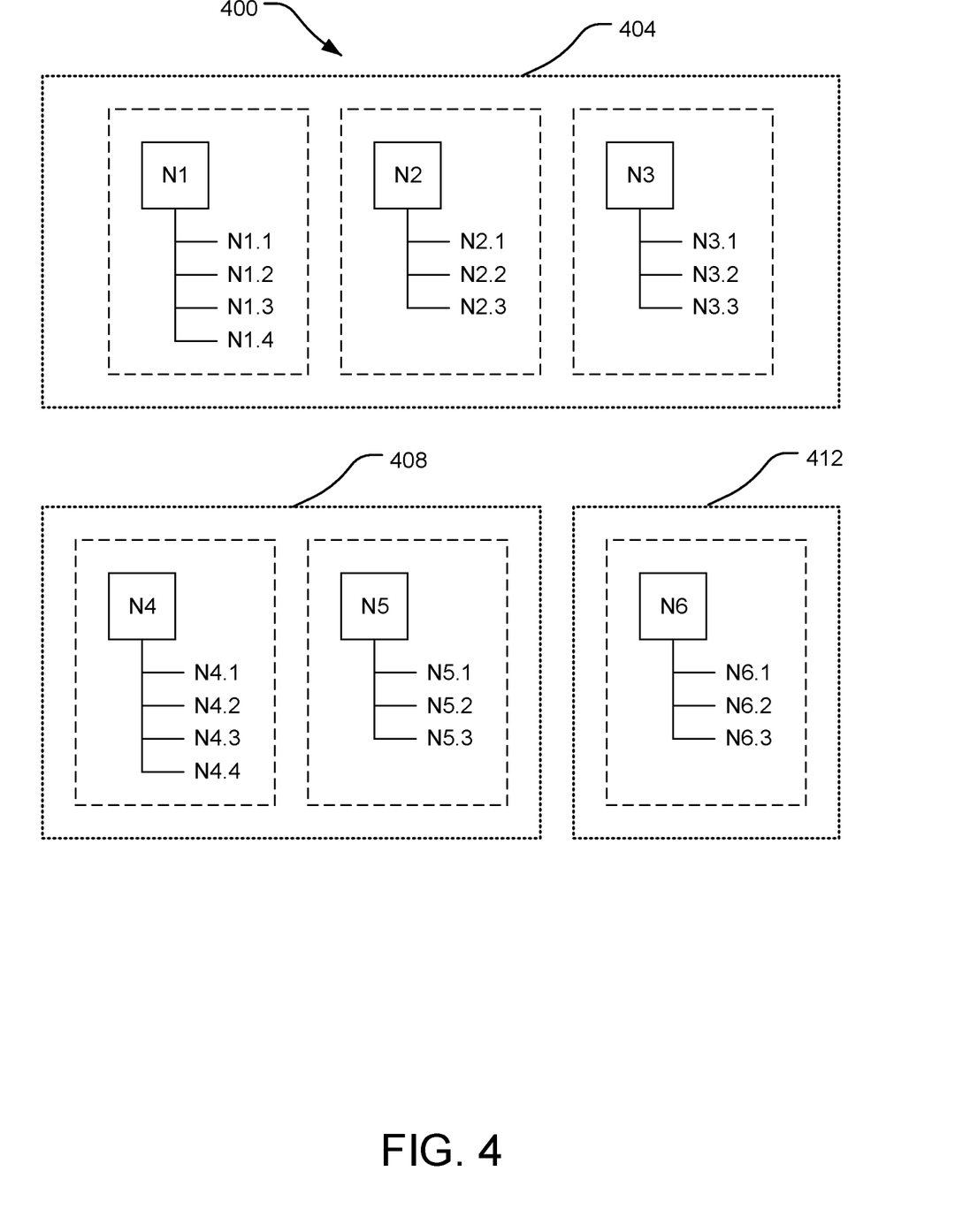
FIG. 4 is a schematic diagram of an exemplary embodiment of a MANET having several subnets according to the inventive concepts disclosed herein.

Referring now to FIG. 4, an embodiment of a network 400 according to the inventive concepts disclosed herein includes a first network 404 including a first node N1, a second node N2, and a third node N3; a second network 408 including a fourth node N4 and a fifth node N5, and a third network 412 including a sixth node N6. The networks 404, 408, and 412 can correspond to respective first, second, and third COIs. The first node N1 is coupled to four nodes N1.1, N1.2, N1.3, N1.4, such as via a baseband interface of the first node N1, which may be assigned routable addresses if they are end user devices, and non-routable addresses if they are gateway devices. Similarly, the second node N2 is coupled to three nodes N2.1, N2.2, and N2.3; the third node N3 is coupled to three nodes N3.1, N3.2, and N3.2; the fourth node N4 is coupled to four nodes N4.1, N4.2, N4.3; the fifth node N5 is coupled to three nodes N5.1, N5.2, and N5.3; and the sixth node N6 is coupled to three nodes N6.1, N6.2, and N6.3. Each of the nodes N1-N6 can have local IP subnets with their respective coupled end user devices.

The nodes N1-N6 can be implemented using the network device 300 described with reference to FIG. 3. For example, the node N1 can include the processing circuit 304. The processing circuit 304 can identify which of the networks 404, 408, 412 is the primary wireless network of the network 400, and which are secondary wireless networks. For example, the processing circuit 304 can count the number of nodes of the networks 404, 408, and 412, and determine that the first network 404 includes thirteen nodes, the second network 408 includes nine nodes, and the third network 412 includes four nodes. Based on these counts, the processing circuit 304 can determine the first network 404 to be the primary wireless network, and the networks 408, 412 to be secondary wireless networks. As described above, the processing circuit 304 can differently advertise routing for the first network 404 versus the secondary networks 408, 412. The processing circuit 304 can also count the number of subnets of the networks 404, 408, 412, to determine that the first network 404 includes three subnets (corresponding to each local IP subnet of each node), the network 408 includes two subnets, and the network 412 includes one subnet, and thus determine the first network 404 to be the primary wireless network and the networks 408, 412 to be the secondary wireless networks.

Figure 5:
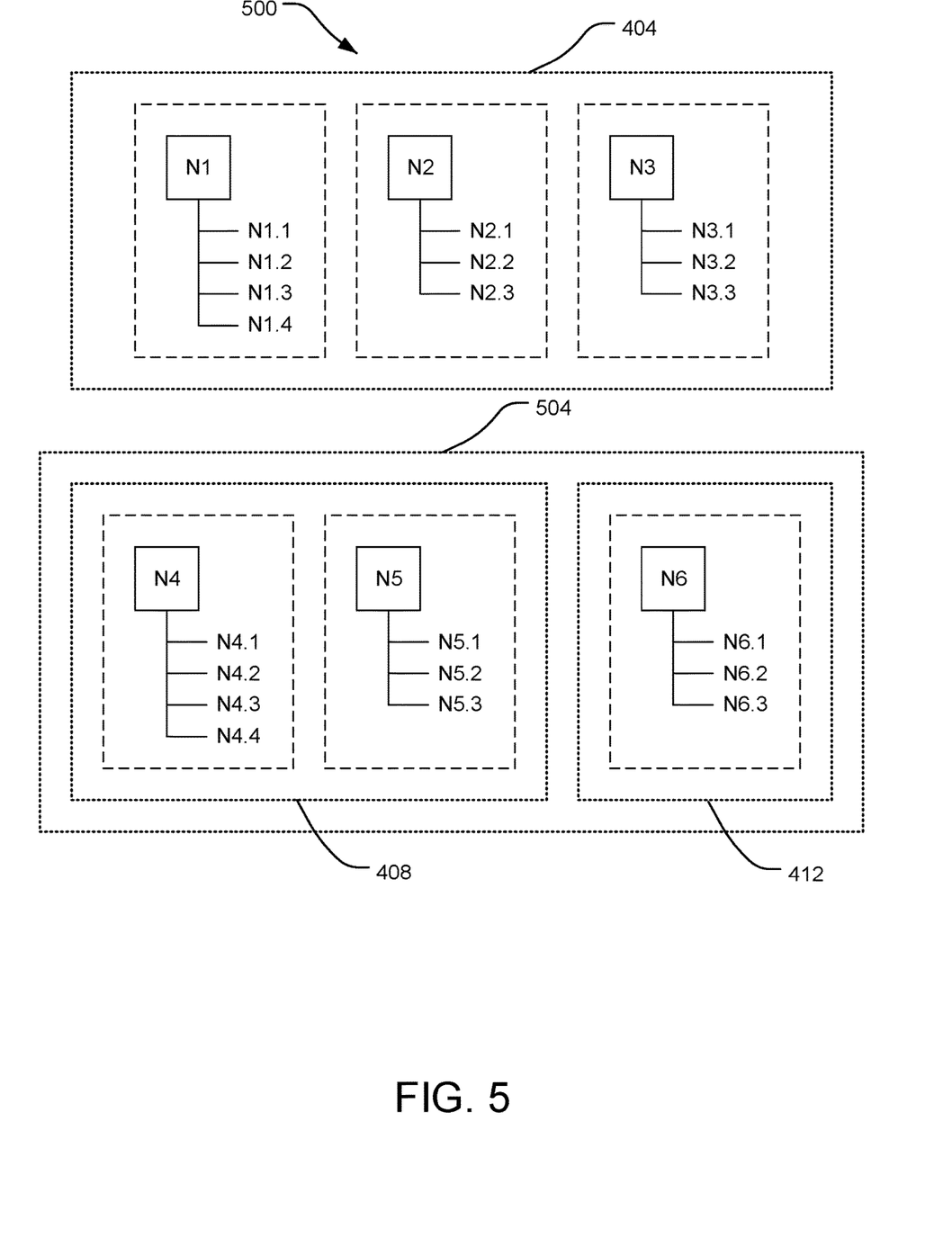
FIG. 5 is a schematic diagram of an exemplary embodiment of the MANET of FIG. 4 in which a node has switched networks according to the inventive concepts disclosed herein.

Referring now to FIG. 5, an embodiment of a network 400 according to the inventive concepts disclosed herein includes the node N6 (and its wireless network 412) having moved to a same, fourth wireless network 504 as the nodes N4 and N5 of the second wireless network 408. The processing circuit 304 can count the number of nodes of the first wireless network 404 to include thirteen nodes, and the number of nodes of the fourth wireless network 504 to include thirteen nodes. Based on both the first and fourth wireless networks 404, 504 having the same count of nodes, the processing circuit 304 determine the first and fourth wireless networks 404, 504 to each be candidate primary wireless networks. To resolve this ambiguity, the processing circuit 304 can count the number of IP subnets of the first wireless network 404 to include three IP subnets, and count the number of IP subnets of the fourth wireless network 504 to include four IP subnets—the local IP subnets of each of the nodes N4, N5, and N6, as well as the second wireless network 408. Accordingly, the processing circuit 304 can determine the fourth wireless network 504 to be the primary wireless network, and advertise the fourth wireless network 504 as a single IP subnet, such as a single COI IP subnet, while using CIDR to advertising routing for the nodes of the first wireless network 404.

Figure 6:
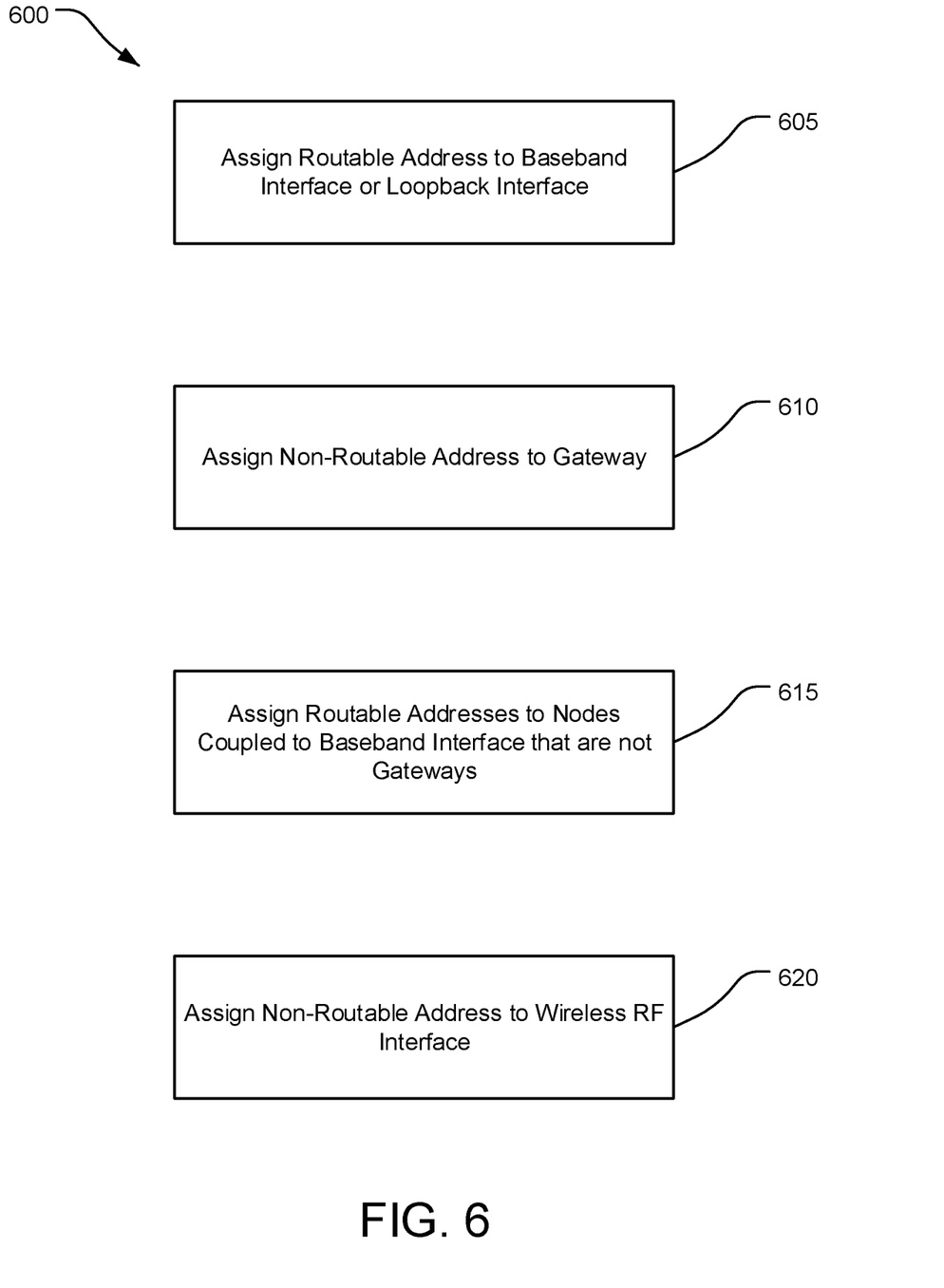
FIG. 6 is a flow diagram of an exemplary embodiment of a method of operating a MANET according to the inventive concepts disclosed herein.

Referring now to FIG. 6, an embodiment of a method 600 according to the inventive concepts disclosed herein includes one or more of the following steps. The method 600 can be performed using various systems and devices described herein, including the network device 300.

A step (605) may include assigning a routable address to at least one of a baseband interface or a loopback interface of a network device. The network device can be a node of a MANET. The baseband interface can be coupled to a first node. Addresses can be defined to be routable or non-routable based on a predetermined address definition. For example, the predetermined address definition can indicate a first portion (e.g., subnet) of an address space to have routable addresses, and a second portion (e.g., subnet) of the address space different than the first portion to have non-routable addresses. The address space can be of the Internet Protocol version 4 (IPv4) or the Internet Protocol version 6 (IPv6). Routable addresses can be those which are used to originate and terminate IP traffic throughout a network that the network device is part of.

A step (610) may include assigning a non-routable address to the first node based on the first node being a gateway interface. This can enable the network device to switch points of attachment to the network via different gateways without changing the IP address used to connect to the gateways.

A step (615) may include assigning a routable address to the first node based on the first node not being a gateway interface, such as if the first node is an end user device. This can enable the first node to originate and terminate IP traffic.

A step (620) may include assigning a non-routable address to a second node coupled to a wireless radio frequency (RF) interface. This can enable MANET node connectivity to change as the MANET nodes move around or change frequencies. In some embodiments, the method 600 includes assigning non-routable addresses to intra-channel SDR interfaces.

In some embodiments, the method 600 includes assigning routable and non-routable addresses from respective IP subnets. For example, routable addresses can be assigned from a COI IP subnet and/or a local IP subnet of the COI IP subnet that the first node is assigned to (if the first node is not a gateway). Non-routable addresses can be assigned from a gateway IP subnet for gateways, from a wireless RF IP subnet for wireless RF interfaces, and from an SDR IP subnet for intra-channel SDR interfaces. In some embodiments, the method 600 includes assigning, from the network device, the same non-routable address for each gateway when the network device connects to each gateway.

The method 600 can include using radio addresses, such as MAC address, to assign addresses. For example, a mapping that maps MAC address to corresponding routable and non-routable addresses can be used to assign the routable address to the baseband interface based on a first MAC address of the baseband interface, and to map the non-routable address to the intra-channel SDR interface based on a second MAC address of the intra-channel SDR interface. The mapping can be a deterministic mapping, such that relatively smaller MAC addresses can be shared amongst nodes to reduce routing overhead.

The method 600 can include separating wireless networks into a primary wireless network and one or more secondary wireless networks, advertising the primary wireless network as a single IP subnet, and advertising the secondary wireless network(s) using CIDR. For example, the method 600 can include identifying a plurality of wireless networks of a COI subnet, counting a number of local IP subnets corresponding to each respective wireless network of the plurality of wireless networks, determining a first wireless network of the plurality of wireless networks having a greatest count of local IP subnets to be a primary wireless network, and determining each wireless network having a lesser count of local IP subnets than the first wireless network to be a secondary wireless network. In some embodiments, the method 600 includes identifying a plurality of candidate primary wireless networks having the greatest count of local IP subnets, the plurality of candidate primary wireless networks including the first wireless network, determining a signaling parameter of each of the plurality of candidate primary wireless networks, and determining one of the candidate primary wireless networks to be the primary wireless network based on the signaling parameter of each of the plurality of candidate primary wireless networks. In some embodiments, the method 600 includes providing, to at least one remote node, a single first routing path for routing to the local IP subnets of the primary wireless network, the single first routing path corresponding to the COI subnet, and providing, to the at least one remote node, a plurality of second routing paths separately corresponding to each respective local IP subnet of each secondary wireless network for routing to each local IP subnet of each secondary wireless network.

As will be appreciated from the above, systems and methods of MANET IP roaming in accordance with the inventive concepts disclosed herein can enable MANET node roaming while reducing overhead and latency resulting from when MANET nodes roam and from maintaining the routing infrastructure used to enable roaming.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A network device, comprising:
   at least one of a baseband interface or a loopback interface, the baseband interface coupled to a first node;
   a wireless radio frequency (RF) interface coupled to a second node;
   an intra-channel software-defined radio (SDR) interface; and
   one or more processors configured to:
      assign a routable address to the at least one of the baseband interface or the loopback interface;
      assign a non-routable address to the first node based on the first node being a gateway interface; and
      assign a routable address to the first node based on the first node not being a gateway interface,
   wherein instructions cause the one or more processors to:
      identify an intra-channel IP subnet; and
      assign the non-routable address to the intra-channel SDR interface from the intra-channel IP subnet.

2. The network device of claim 1, wherein the one or more processors are configured to assign a non-routable address to the second node based on the second node being coupled to the wireless RF interface.

3. The network device of claim 1, wherein the one or more processors are configured to:
   identify a gateway IP subnet of a plurality of gateway interfaces that the baseband interface is coupled to; and
   assign non-routable addresses to the plurality of gateway interfaces from the gateway IP subnet.

4. The network device of claim 1, wherein the one or more processors are configured to:
   operate using an Internet Protocol version 4 (IPv4) protocol; and assign the non-routable address as an IPv4 non-routable address.

5. The network device of claim 1, wherein the one or more processors are configured to:
operate using an Internet Protocol version 6 (IPv6) protocol; and
assign the non-routable address as an IPv6 non-routable address.

6. A network device, comprising:
at least one of a baseband interface or a loopback interface, the baseband interface coupled to a first node;
a wireless radio frequency (RF) interface coupled to a second node;
an intra-channel software-defined radio (SDR) interface; and
one or more processors configured to:
assign a routable address to the at least one of the baseband interface or the loopback interface;
assign a non-routable address to the first node based on the first node being a gateway interface;
assign a routable address to the first node based on the first node not being a gateway interface;
identify a community of interest (COI) internet protocol (IP) subnet that the first node is assigned to;
identify a local IP subnet of the COI IP subnet; and
assign the routable address to the first node from the local IP subnet.

7. The network device of claim 6, wherein the one or more processors are configured to:
maintain a mapping that maps media access control (MAC) addresses to corresponding routable addresses and non-routable addresses;
use the mapping to assign the routable address to the baseband interface based on a first MAC address of the baseband interface; and
use the mapping to map the non-routable address to an intra-channel SDR interface.

8. A network device, comprising:
at least one of a baseband interface or a loopback interface, the baseband interface coupled to a first node;
a wireless radio frequency (RF) interface coupled to a second node;
an intra-channel software-defined radio (SDR) interface; and
one or more processors configured to:
assign a routable address to the at least one of the baseband interface or the loopback interface;
assign a non-routable address to the first node based on the first node being a gateway interface;
assign a routable address to the first node based on the first node not being a gateway interface;
identify a community of interest (COI) internet protocol (IP) a COI IP subnet that the baseband interface is assigned to;
identify a local IP subnet of the COI subnet; and
assign the routable address to the baseband interface from the local IP subnet.

9. The network device of claim 1, wherein the one or more processors are configured to:
identify a gateway IP subnet; and
assign the non-routable address to the gateway interface from the gateway IP subnet.

10. A network device, comprising:
at least one of a baseband interface or a loopback interface, the baseband interface coupled to a first node;
a wireless radio frequency (RF) interface coupled to a second node;
an intra-channel software-defined radio (SDR) interface; and
one or more processors configured to:
assign a routable address to the at least one of the baseband interface or the loopback interface;
assign a non-routable address to the first node based on the first node being a gateway interface;
assign a routable address to the first node based on the first node not being a gateway interface;
identify a plurality of wireless networks of a community of interest (COI) subnet;
count a number of local internet protocol (IP) subnets corresponding to each respective wireless network of the plurality of wireless networks;
determine a first wireless network of the plurality of wireless networks having a greatest count of local IP subnets to be a primary wireless network; and
determine each wireless network having a lesser count of local IP subnets than the first wireless network to be a secondary wireless network.

11. The network device of claim 10, wherein the one or more processors are configured to:
identify a plurality of candidate primary wireless networks having the greatest count of local IP subnets, the plurality of candidate primary wireless networks including the first wireless network;
determine a signaling parameter of each of the plurality of candidate primary wireless networks; and
determine one of the candidate primary wireless networks to be the primary wireless network based on the signaling parameter of each of the plurality of candidate primary wireless networks.

12. The network device of claim 10, wherein the one or more processors are configured to:
provide, to at least one remote node, a single first routing path for routing to the local IP subnets of the primary wireless network, the single first routing path corresponding to the COI subnet; and
provide, to the at least one remote node, a plurality of second routing paths separately corresponding to each respective local IP subnet of each secondary wireless network for routing to each local IP subnet of each secondary wireless network.

13. A method of operating a mobile ad-hoc network, comprising:
assigning a routable address to at least one of a baseband interface or a loopback interface, the baseband interface coupled to a first node;
assigning a non-routable address to the first node based on the first node being a gateway interface; and
assigning a routable address to the first node based on the first node not being a gateway interface;
assigning a non-routable address to a second node coupled to a wireless radio frequency (RF) interface;
identifying a plurality of wireless networks of a community of interest (COI) subnet;
counting a number of local internet protocol (IP) subnets corresponding to each respective wireless network of the plurality of wireless networks;
determining a first wireless network of the plurality of wireless networks having a greatest count of local IP subnets to be a primary wireless network; and
determining each wireless network having a lesser count of local IP subnets than the first wireless network to be a secondary wireless network.

14. The method of claim 13, comprising:
identifying a first IP subnet of the first node;

assigning the routable address to the first node using the first IP subnet;
identifying a second IP subnet of the second node; and
assigning the routable address to the second node using the second IP subnet.

15. A non-transitory computer-readable medium storing computer-readable instructions that when executed by one or more processors, cause the one or more processors to:
assign a routable address to at least one of a baseband interface or a loopback interface of a network device;
assign a non-routable address to a first node coupled to the baseband interface based on the first node being a gateway interface;
assign a routable address to the first node based on the first node not being a gateway interface;
assign a non-routable address to a second node coupled to a wireless radio frequency (RF) interface of the network device based on the second node being coupled to the wireless RF interface;
identify a plurality of wireless networks of a community of interest (COI) subnet;
count a number of local internet protocol (IP) subnets corresponding to each respective wireless network of the plurality of wireless networks;
determine a first wireless network of the plurality of wireless networks having a greatest count of local IP subnets to be a primary wireless network; and
determine each wireless network having a lesser count of local IP subnets than the first wireless network to be a secondary wireless network.

16. The non-transitory computer-readable medium of claim 15, comprising instructions that cause the one or more processors to:
identify a gateway IP subnet of a plurality of gateway interfaces that the baseband interface is coupled to; and
assign non-routable addresses to the plurality of gateway interfaces from the gateway IP subnet.

\* \* \* \* \*